United States Patent
Nakamura et al.

(10) Patent No.: US 8,521,351 B2
(45) Date of Patent: Aug. 27, 2013

(54) CREEPING-CUT CONTROL APPARATUS FOR ELECTRICALLY DRIVEN VEHICLE

(75) Inventors: Yohei Nakamura, Sagamihara (JP); Isamu Kazama, Odawara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/704,812

(22) PCT Filed: May 13, 2011

(86) PCT No.: PCT/JP2011/061053
§ 371 (c)(1),
(2), (4) Date: Dec. 17, 2012

(87) PCT Pub. No.: WO2012/002049
PCT Pub. Date: Jan. 5, 2012

(65) Prior Publication Data
US 2013/0090800 A1 Apr. 11, 2013

(30) Foreign Application Priority Data
Jun. 30, 2010 (JP) ................ 2010-150043

(51) Int. Cl.
*B60L 11/00* (2006.01)
(52) U.S. Cl.
USPC .......................................................... 701/22
(58) Field of Classification Search
None
See application file for complete search history.

(56) References Cited

U.S. PATENT DOCUMENTS

| | | | |
|---|---|---|---|
| 5,457,363 A * | 10/1995 | Yoshii et al. | 318/432 |
| 6,547,344 B2 | 4/2003 | Hada et al. | |
| 7,295,918 B2 * | 11/2007 | Nada | 701/116 |
| 7,770,675 B2 | 8/2010 | Hayashi | |
| 2002/0021045 A1 | 2/2002 | Hada et al. | |
| 2007/0199745 A1 | 8/2007 | Hayashi | |
| 2010/0076637 A1 | 3/2010 | Ueoka | |

FOREIGN PATENT DOCUMENTS

| | | |
|---|---|---|
| JP | 2001-354126 A | 12/2001 |
| JP | 2003-061205 A | 2/2003 |
| JP | 2007-230288 A | 9/2007 |
| JP | 2007-236168 A | 9/2007 |
| JP | 2008-167540 A | 7/2008 |
| JP | 2010-093990 A | 4/2010 |

* cited by examiner

*Primary Examiner* — Thomas Tarcza
*Assistant Examiner* — Adam Alharbi
(74) *Attorney, Agent, or Firm* — Foley & Lardner LLP

(57) ABSTRACT

A vehicle moves unintentionally in a downwardly-reverse direction with a forward creep torque being outputted as shown by a time variation of vehicle speed VSP, and a braking is applied at timing t3 in order to prevent this downward movement. In this case, the downward movement in the reverse direction is detected at timing t1, and then this state continues for a duration set corresponding to a timer value NTM1. At timing t2, a creeping-cut is prohibited by setting a creeping-cut-prohibition flag NFLAG at "1". At timing t3, the braking is started in order to prevent the reverse-directional downward movement. Thereby, at timing t5, the vehicle speed VSP becomes near 0. In response thereto, a conventional creeping-cut permitting flag FLAG is set at 1. However, the creep toque continues to be outputted also after t5 without the creeping-cut, so that a torque reduction accompanied with strangeness feeling can be prevented.

6 Claims, 5 Drawing Sheets

(Reverse-directional downward movement under forward range → Vehicle stop)

CREEPING-CUT CONTROL APPARATUS FOR ELECTRICALLY DRIVEN VEHICLE

TECHNICAL FIELD

The present invention relates to improvement proposal of a creeping-cut control apparatus provided in an electrically-driven vehicle such as a battery vehicle which uses only an electric motor as its power source and a hybrid vehicle which runs by use of energy derived from engine and electric motor.

BACKGROUND ART

An electrically-driven vehicle drives an electric motor in accordance with a range selected by a shift manipulation which is done by a driver to produce a running mode of the vehicle. By transmitting this power from the electric motor to road-wheels, an electric running can be realized.

When the electrically-driven vehicle is made to run at very low speed (is made to creep) by creep torque with a forward-or-reverse-running range selected as in the case of automatic-transmission vehicle; the electric motor is driven and controlled to output the minute creep torque from the electric motor, and this creep torque is transmitted to the road-wheels to enable the creep running of the electrically-driven vehicle.

For example, Patent Literature 1 proposes a creep-running control technique for an electrically-driven vehicle. In this technique, in addition to enabling the creep running of the electrically-driven vehicle as mentioned above, a creeping-cut which reduces the creep torque of the electric motor (down to zero) is performed when a predetermined creeping-cut permitting condition is satisfied. This predetermined condition is that a detection value of vehicle speed is lower than a set value and also a braking force is larger than or equal to a set value, for example, when the vehicle is in a stopped state with no intention to start moving the vehicle. Such a creeping-cut is performed because the creep running is not conducted immediately and also because a power consumption can be suppressed.

However, in the creeping-cut control apparatus for electrically-driven vehicle as disclosed in Patent Literature 1, the creeping-cut which reduces the creep torque of the electric motor (down to zero) is unconditionally performed when the predetermined creeping-cut permitting condition is satisfied, for example, when the vehicle is in a stopped state with no intention to start moving the vehicle. Therefore, the following problem is caused.

For example, a case will now be discussed where the electrically-driven vehicle located on an upwardly-sloping road moves downwardly in a reverse-running direction because a stopped state of the vehicle cannot be maintained by the creep torque when a forward-running range (DRIVE-mode) is being selected. In this case, in order to prevent the downward movement in the reverse direction, the driver brings the vehicle speed close to 0 by depressing a brake pedal and thereby applying a braking to the vehicle or by increasing the depression of the brake pedal and thereby enlarging a braking force for the vehicle.

During this downward movement in the reverse direction, (an absolute value of) the vehicle speed is not near 0. Hence, the creeping-cut permitting condition is not satisfied regardless of a state of the braking, so that the creep torque is being outputted from the electric motor. Then, when (the absolute value of) the vehicle speed becomes near 0 by a braking of brake-pedal manipulation for preventing the reverse-directional downward movement of the vehicle, the creeping-cut permitting condition is satisfied, so that the creep toque which is outputted from the electric motor is brought to 0 by the creeping-cut.

Before the creep torque is brought to 0 by such a creeping-cut, the driver is adjusting his depressing force of the brake pedal to balance with a gradient resistance of the upwardly-sloping road in consideration of the creep torque. Therefore, when the creep torque is brought to 0 by the creeping-cut, the driver feels a torque reduction unrelated to his own driving manipulations, i.e., an unintended torque reduction. Hence, a problem is caused that the driver has a feeling of strangeness.

This problem is caused similarly also when the electrically-driven vehicle moves downwardly in the forward direction under a reverse-running range (REVERSE-mode), i.e., when even a stopped state of the vehicle cannot be maintained by the creep torque although the driver is trying to run the vehicle in the reverse direction on a sloping road by the creep torque.

That is, in the case that the electrically-driven vehicle moves in a direction opposite to the running direction of the selected running range against the creep torque outputted according to the selected running range, the above-mentioned problem is caused when (an absolute value of) the vehicle speed is reduced to a value near 0 by a braking performed to prevent this opposite-directional movement of the vehicle and thereby the creeping-cut permitting condition is satisfied.

CITATION LIST

Patent Literature

Patent Literature 1: Japanese Patent Application Publication No. 2010-093990

SUMMARY OF THE INVENTION

It is an object of the present invention to provide a creeping-cut control apparatus for an electrically-driven vehicle, devised to solve the above-mentioned problem by embodying an idea that the problem can be solved in a case that the creeping-cut is prohibited not to execute the creeping-cut even if the creeping-cut permitting condition is satisfied.

For this purpose, according to the present invention, a creeping-cut control apparatus for an electrically-driven vehicle is constructed as follows. At first, the electrically-driven vehicle which is a basic precondition of a main structure according to the present invention will now be explained. This electrically-driven vehicle is configured to run by transmitting power from an electric motor to a road wheel in accordance with a shift range selected by a shift manipulation which is done by a driver to produce a running mode of the vehicle. Moreover, the electrically-driven vehicle is configured to creep at a very low speed by a creep torque derived from the electric motor. Moreover, the electrically-driven vehicle is configured to execute a creeping-cut such that the creep torque of the electric motor is reduced when a predetermined creeping-cut permitting condition is being satisfied.

For such an electrically-driven vehicle, the creeping-cut control apparatus according to the present invention includes an opposite-directional-vehicle-movement detecting means configured to detect that the electrically-driven vehicle is moving in a direction opposite to the running direction of the selected shift range under a state where the creep torque is being outputted without executing the creeping-cut; and a creeping-cut prohibiting means configured to prohibit the creeping-cut regardless of the satisfaction of the creeping-cut permitting condition, when the opposite-directional-vehiclemovement detecting means detects that the vehicle has moved in the opposite direction.

According to such a creeping-cut control apparatus for an electrically-driven vehicle, the creeping-cut is prohibited when it is detected that the electrically-driven vehicle has moved in the direction opposite to the normal running direction of the shift range which is being selected. Hence, even if the vehicle speed becomes near 0 by the braking for preventing this opposite-directional movement of the vehicle so that the creeping-cut permitting condition is satisfied, the creeping-cut is not carried out.

Contrary to this, in the case that the creeping-cut is carried out at such a timing, a torque reduction which is caused by this creeping-cut is irrelevant to a driving manipulation of the driver, i.e., is not a phenomenon intended by the driver. In this case, the driver has a strangeness feeling. However, according to the present invention, such a torque reduction causing the strangeness feeling can be prevented by prohibiting the creeping-cut.

DETAILED DESCRIPTION OF INVENTION

Figure 1:
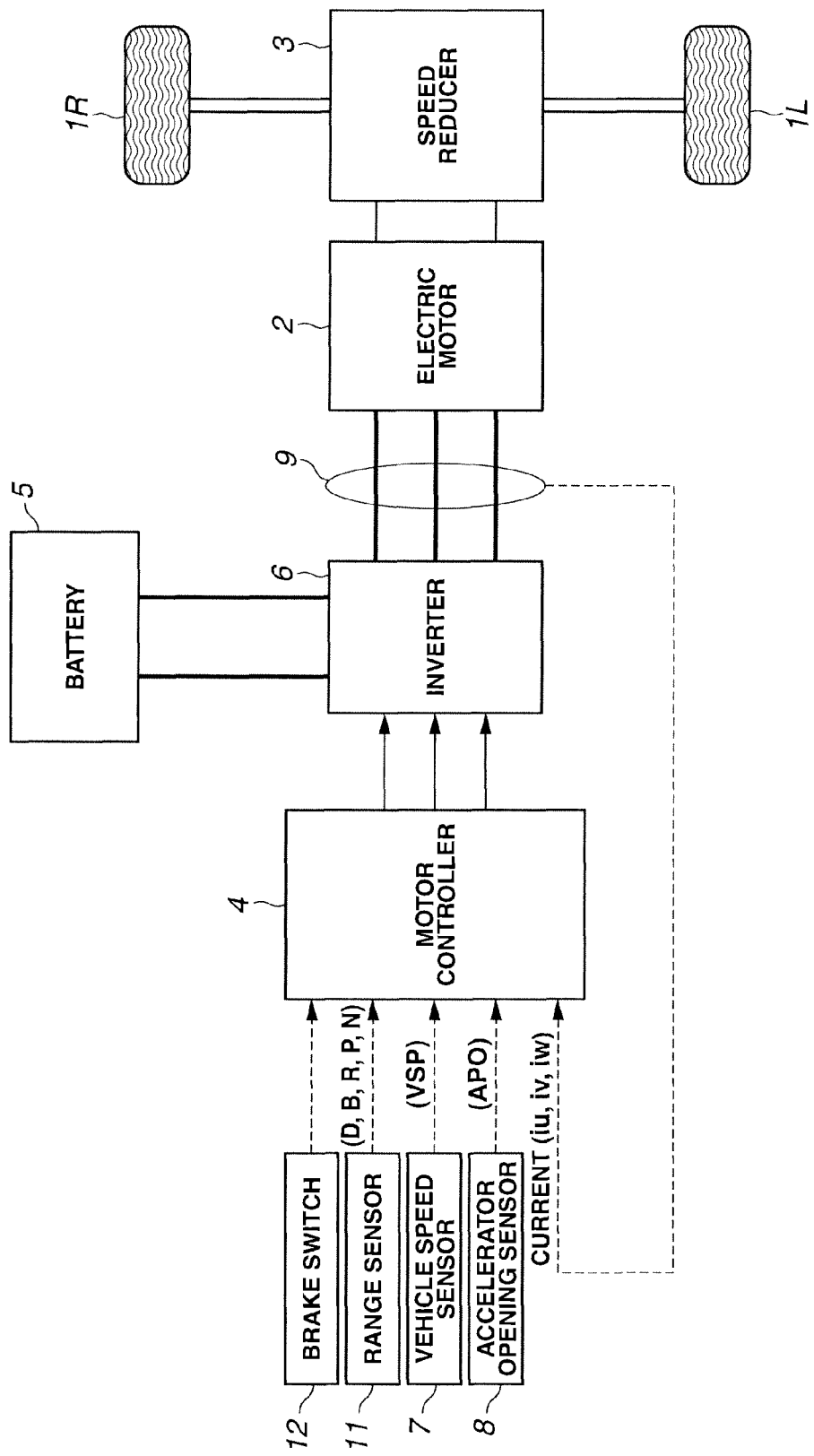
FIG. 1 A schematic system view showing a drive system and a control system for the drive system in a vehicle equipped with a creeping-cut control apparatus in an embodiment according to the present invention FIG. 2 A flowchart showing a first-half part of a creeping-cut control program which is executed by a motor controller shown in FIG. 1.

Hereinafter, embodiments according to the present invention will be explained in detail referring to the drawings.
<Configuration>
FIG. 1 is a view showing a drive system and a control system for the drive system in a vehicle equipped with a creeping-cut control apparatus in an embodiment according to the present invention. The vehicle in this embodiment as shown in FIG. 1 is an electric-powered vehicle which can run by driving front left and right (road-)wheels 1L and 1R, or rear left and right (road-)wheels. These front left and right wheels 1L and 1R are driven by an electric motor 2 through a speed reducer 3 including a differential gear unit.

A battery 5 functions as an electric-power source. A motor controller 4 converts direct-current (DC) power of the battery 5 into alternate-current (AC) power by an inverter 6. This AC power is supplied to the electric motor 2 under a control of the inverter 6. Thereby, the electric motor 2 is controlled such that a torque of the electric motor 2 becomes equal to a calculation result (target motor-torque value) of the motor controller 4.

In a case that the calculation result (target motor-torque value) of the motor controller 4 is a creep torque responding to a creep running request of the vehicle, the motor controller 4 supplies a creep-torque-generating current to the electric motor 2 by use of the inverter 6. At this time, the electric motor 2 generates the creep torque, and transmits this creep torque through the speed reducer 3 to the left and right wheels 1L and 1R, so that the vehicle can run by creeping.

Moreover, in a case that the calculation result (target motor-torque value) of the motor controller 4 is a negative value for requiring the electric motor 2 to produce a regenerative braking, the motor controller 4 applies a power-generating load to the electric motor 2 by the inverter 6. At this time, electric power generated by the regenerative braking of the electric motor 2 is converted into direct-current (DC) power by AC-to-DC conversion of the inverter 6, and then is charged into the battery 5.

The motor controller 4 receives signals derived from a vehicle speed sensor 7, an accelerator opening sensor 8, an electric-current sensor 9, a range sensor 11 and a brake switch 12, as information for the above-mentioned calculation of the target motor-torque value. The vehicle speed sensor 7 senses a vehicle speed VSP which is a speed of the electrically-driven vehicle with respect to ground. The accelerator opening sensor 8 senses an accelerator opening APO (electric-motor-desired load) which is a depressed amount of accelerator pedal by a driver. The electric-current sensor 9 senses electric current (electric-current values iu, iv and iw of three-phase AC having U-phase, V-phase and W-phase in the case of FIG. 1) of the electric motor 2. The range sensor 11 senses which has been selected from a forward-running range (D-range, i.e., DRIVE-mode), a motor-speed limiting range (B-range, i.e., BRAKE-mode corresponding to Engine-brake mode in the case of automatic-transmission vehicle), a reverse running range (R-range, REVERSE-mode), a vehicle-stop range (N-range, i.e., NEUTRAL-mode) and a parking range (P-range, i.e., PARKING-mode), by a shift manipulation of the driver in order to produce a command for a running mode of the vehicle. That is, the range sensor 11 senses a currently-selected shift position. The brake switch 12 is turned on (becomes in ON-state) in response to a stroke level of brake pedal or a fluid-pressure level of master cylinder which causes a braking force to become greater than or equal to a set braking-force value (creeping-cut-permitting braking-force value) provided for determining that the driver has no intention to start moving the vehicle.

The motor controller 4 produces a PWM signal for controlling the electric motor 2 in accordance with the received information, and produces a drive signal for the inverter 6 by use of drive circuit in accordance with the PWM signal. The inverter 6 includes, for example, two switching elements (e.g., power semiconductor elements such as IGBTs) per each phase. The inverter 6 turns on/off the respective switching elements in accordance with the drive signal, and thereby converts direct current supplied from the battery 5 into alternating current or converts alternating current from the electric motor 2 into direct current. Thus, the inverter 6 supplies electric current corresponding to the target motor-torque value, to the electric motor2.

The electric motor 2 generates driving force according to the alternating current supplied from the inverter 6, and then transmits the driving force through the speed reducer 3 to the left and right wheels 1L and 1R. Moreover, when the electric motor 2 is dragged by the left and right wheels 1L and 1R during the vehicle running, i.e., at the time of so-called inverse drive, the electric motor 2 is given power-generating load so that the electric motor 2 performs the regenerative braking. Thereby, at this time, kinetic energy of the vehicle is regenerated and stored (charged) into the battery 5.

<Creeping-cut Control>

Figure 2:
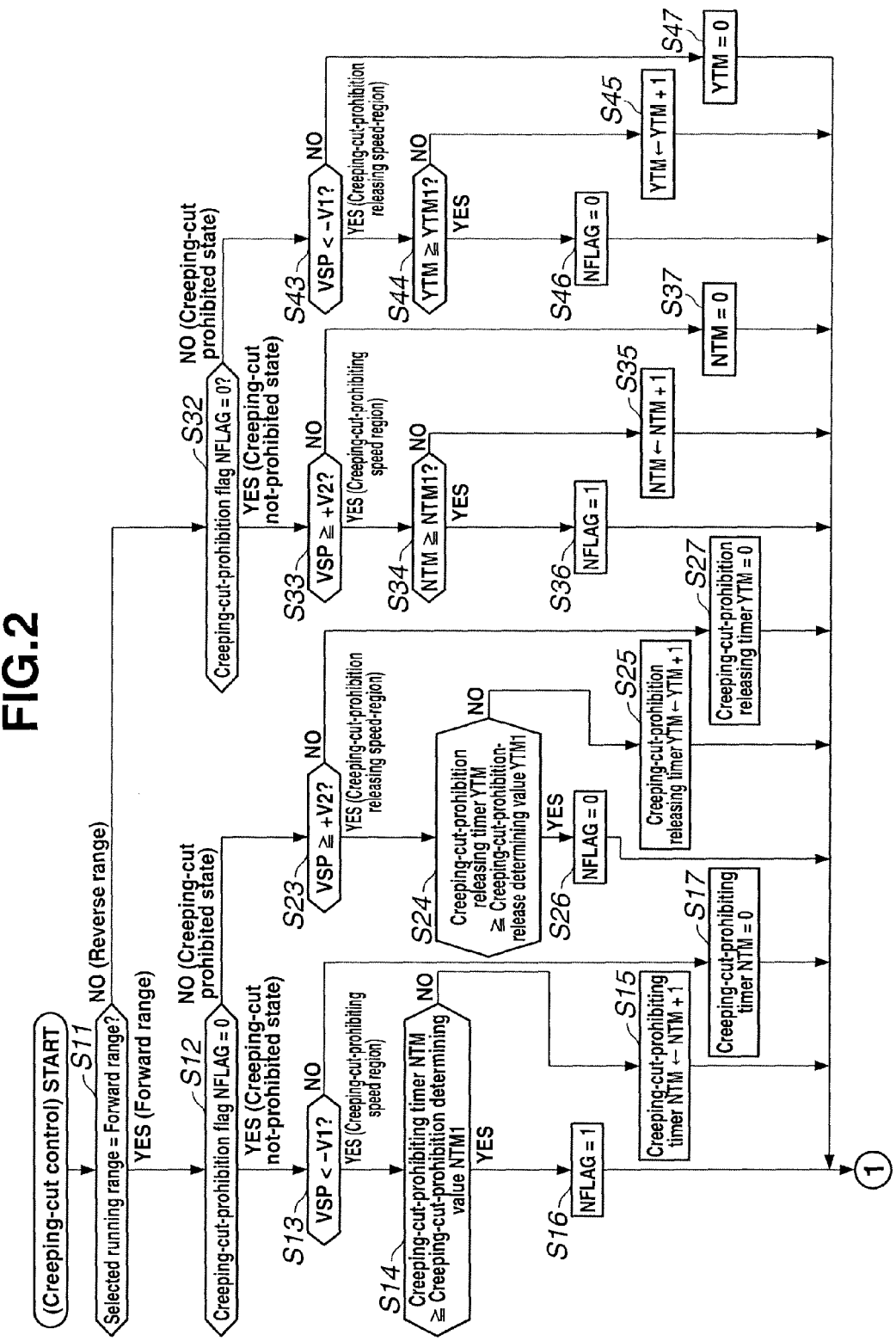
Figure 3:
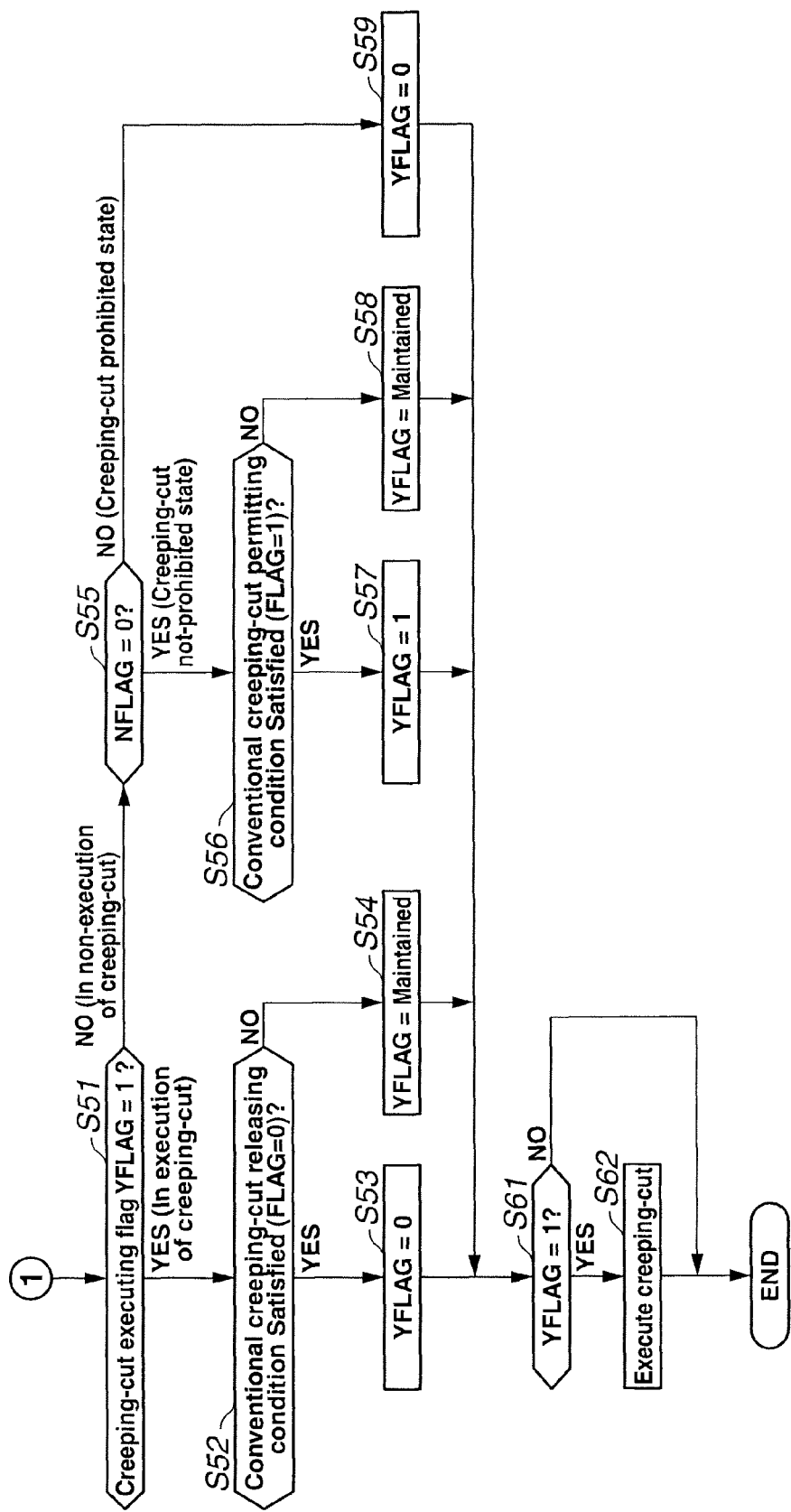
FIG. 3 A flowchart showing a second-half part of the creeping-cut control program which is executed by the motor controller shown in FIG. 1.

The motor controller 4 performs a creeping-cut control by executing control programs shown in FIGS. 2 and 3. That is, the motor controller 4 calculates the target motor-torque values for creep running, and outputs commands thereof to the inverter 6, so that a drive control of the electric motor 2 for creep running is performed (including the creeping-cut control, a creeping-cut prohibiting control, a creeping-cut-prohibition releasing control).

The control programs of FIGS. 2 and 3 are repeatedly executed when any running range which carries out the creep running is being selected (has been selected). At step S11 of FIG. 2, it is judged whether a forward range such as the above-mentioned forward-running (D) range and the motor-speed limiting (B) range (corresponding to engine-brake range) is being selected or a reverse range such as the above-mentioned reverse-running (R) range is being selected.

If it is determined that the forward range is active at step S11, the program proceeds to step S12 so that a prohibition or permission of the creeping-cut is decided as follows. At step S12, it is judged whether a creeping-cut-prohibition flag NFLAG which is set as mentioned later indicates "0" or "1", i.e., false or true. Thereby, it is judged whether the creeping-cut is not (yet) being prohibited or is (already) being prohibited.

Figure 4:
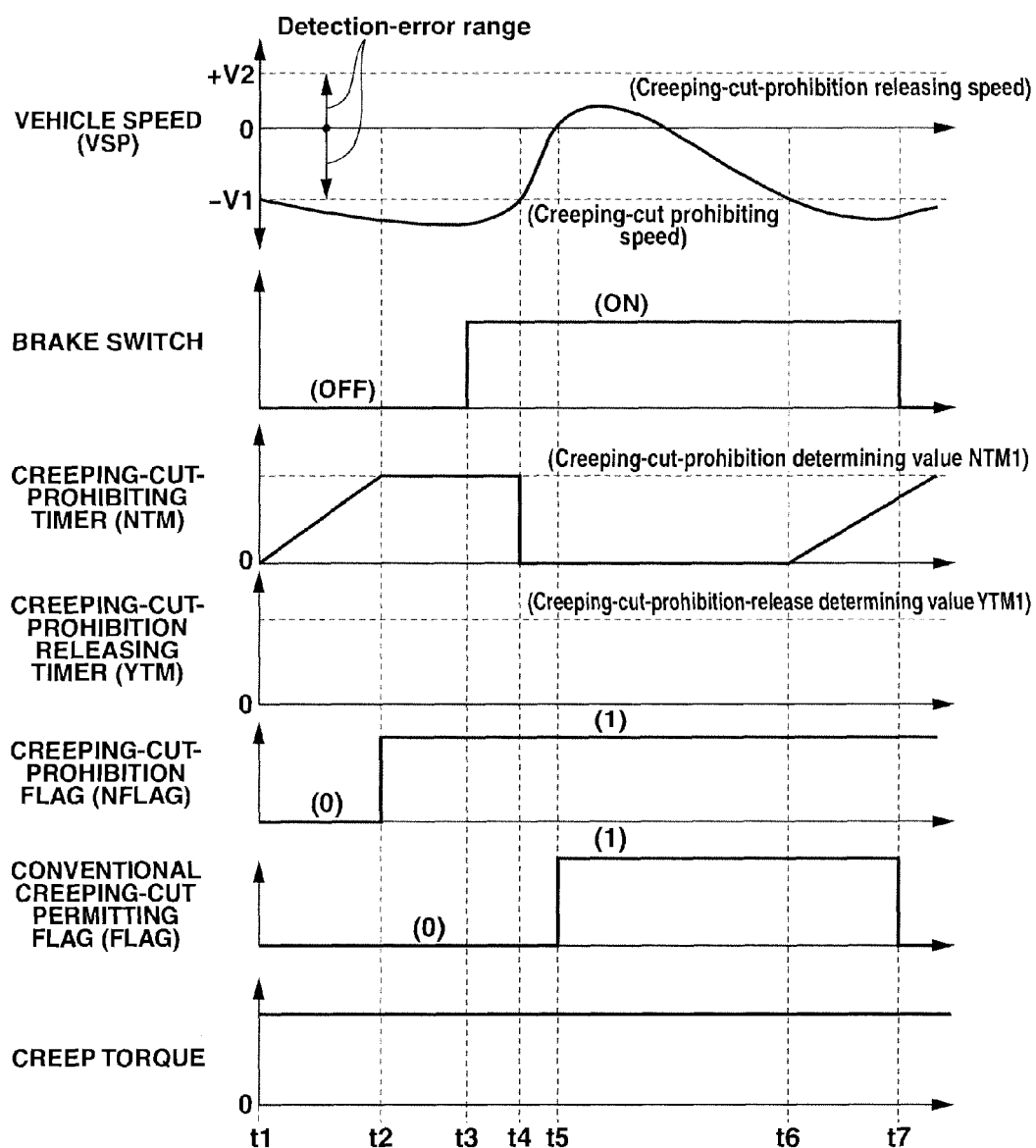
FIG. 4 A time chart showing operations obtained by the control program of FIGS. 2 and 3, in a case that an electrically-driven vehicle moves unintentionally in a downwardly reverse-running direction (crawls down) with a creep torque accompanied with a forward range, and then a driver brakes and stops the electrically-driven vehicle in order to prevent the unintentionally downward movement in the reverse-running direction.
Figure 5:
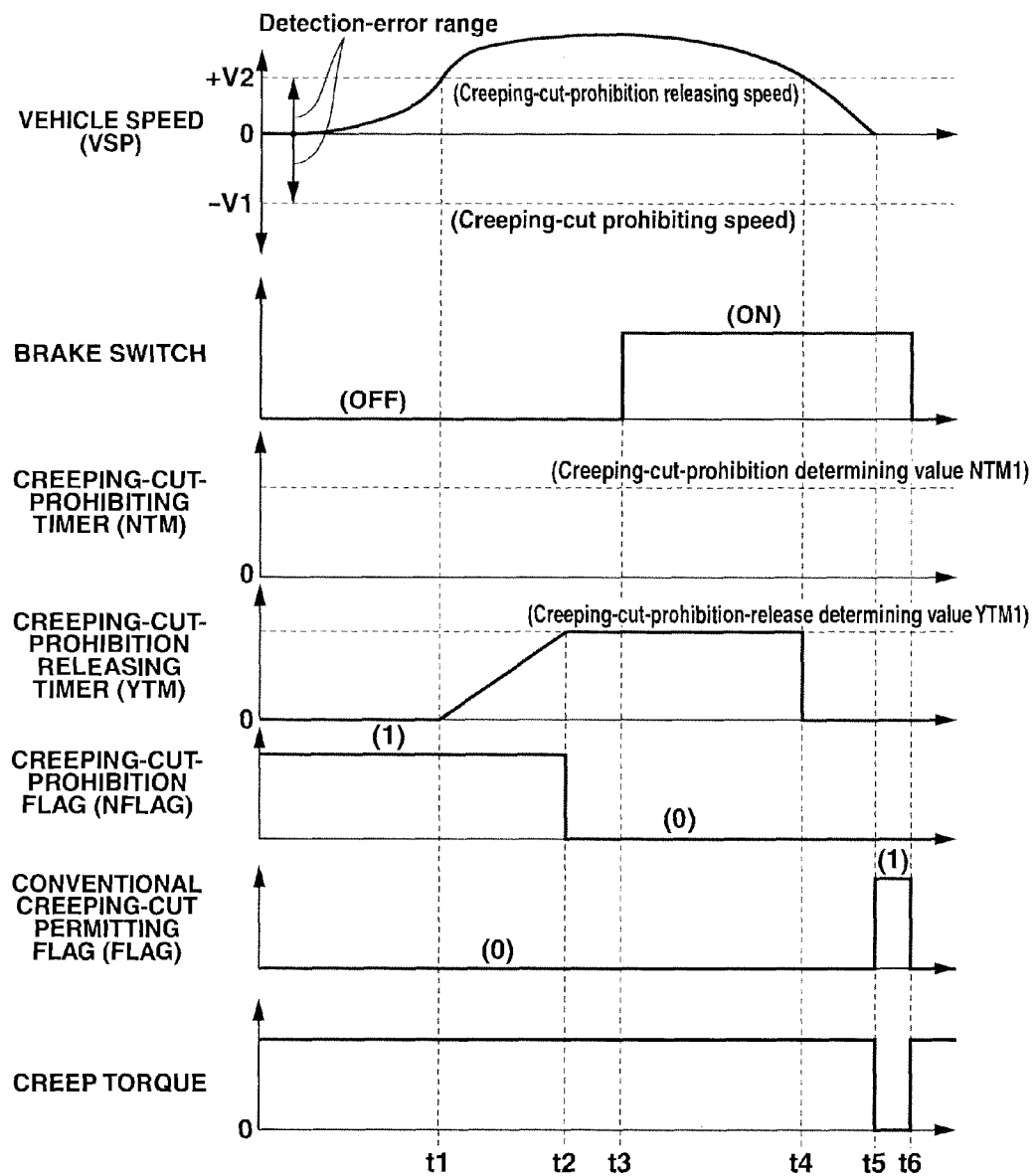
FIG. 5 A time chart showing an operational situation by the control program of FIGS. 2 and 3, in a case that a creep running is conducted from a state where a creeping-cut is being prohibited as shown in FIG. 4, and then the creep running is finished to stop the vehicle by manipulating the brake.

If the creeping-cut-prohibition flag NFLAG indicates "0" (NFLAG=0, i.e., a creeping-cut not-yet-prohibited state) at step S12, the program proceeds to step S13 in order to judge whether or not the creeping-cut should be prohibited, i.e., in order to judge whether or not the creeping-cut-prohibition flag NFLAG should be set at "1" as follows. At first, at step S13, it is judged whether or not the vehicle speed VSP is within a creeping-cut-prohibiting speed region which is lower than a creeping-cut-prohibiting speed value −V1 provided for the forward range as shown in FIGS. 4 and 5. In other words, it is judged whether or not an absolute value of the vehicle speed VSP (negative value) is larger than an absolute value (V1) of the creeping-cut-prohibiting speed value −V1, i.e., whether or not the vehicle speed VSP is higher than the absolute value (V1) in the reverse-running direction.

Explanations about the creeping-cut prohibiting speed −V1 for the forward range as shown in FIGS. 4 and 5 will now be given. The vehicle speed sensor 7 of FIG. 1 which is used for the judgment on the creeping-cut-prohibiting speed region detects a value of the vehicle speed VSP which includes a detection error due to noise. Therefore, in this embodiment, in the case that the value of vehicle speed VSP falls within a range between the value −V1 and a value +V2 whose absolute values are slightly larger than a magnitude of the detection error, this value of vehicle speed VSP is not used as threshold for the judgment on the creeping-cut-prohibiting speed region. The judgment on the creeping-cut-prohibiting speed region is carried out as follows.

In the case of forward range; a detection value of vehicle speed VSP during the creep running is normally a positive value, and a negative detection value of vehicle speed VSP means the above-mentioned unintentionally-downward movement of the vehicle in the reverse direction on an upward sloping road or the like. Hence, as shown in FIGS. 4 and 5, −V1 denotes the creeping-cut-prohibiting speed value, and +V2 denotes a creeping-cut-prohibition releasing speed value. Moreover, a vehicle-speed region lower than the creeping-cut-prohibiting speed value −V1 for the forward range (i.e., a vehicle-speed region larger than V1 in the reverse direction) denotes the creeping-cut-prohibiting speed region as shown in FIGS. 4 and 5. A vehicle-speed region higher than the creeping-cut-prohibition releasing speed value +V2 for the forward range denotes the creeping-cut-prohibition releasing speed region as shown in FIGS. 4 and 5.

In the case of reverse range, a detection value of vehicle speed VSP during the creep running is normally a negative value, and a positive detection value of vehicle speed VSP means the above-mentioned unintentionally-downward movement of the vehicle in the forward direction on an upward slope or the like. Hence, contrary to the case of forward range shown in FIGS. 4 and 5; +V2 denotes the creeping-cut-prohibiting speed value, and −V1 denotes the creeping-cut-prohibition releasing speed value. Moreover, a vehicle-speed region higher than the creeping-cut-prohibiting speed value +V2 for the reverse range denotes the creeping-cut-prohibiting speed region. A vehicle-speed region lower than the creeping-cut-prohibition releasing speed value −V1 for the reverse range (i.e., a vehicle-speed region larger than V1 in the reverse direction) denotes the creeping-cut-prohibition releasing speed region.

While it is determined that the vehicle speed VSP is within the creeping-cut-prohibiting speed region (VSP<−V1) at step S13, it is judged whether or not a creeping-cut-prohibiting timer NTM has already indicated (has reached) a creeping-cut-prohibition determining value NTM1 at step S14. This creeping-cut-prohibiting timer NTM functions to measure an elapsed time from a timing when the vehicle speed VSP entered the creeping-cut-prohibiting speed region. Until the indication of the creeping-cut-prohibiting timer NTM reaches the creeping-cut-prohibition determining value NTM1, the program proceeds to step S15. At step S15, the creeping-cut-prohibiting timer NTM is incremented, and thereby a time length elapsed from the time point when the vehicle speed VSP entered the creeping-cut-prohibiting speed region (given by VSP<−V1) is measured.

When the creeping-cut-prohibiting timer NTM becomes larger than or equal to the creeping-cut-prohibition determining value NTM1 by the increment of the creeping-cut-prohibiting timer NTM at step S15, namely, when the set time corresponding to the creeping-cut-prohibition determining value NTM1 has elapsed from the timing when the vehicle speed VSP entered the creeping-cut-prohibiting speed region; the program proceeds from step S14 to step S16. At step S16, the creeping-cut-prohibition flag NFLAG is set at "1", so that the creeping-cut is prohibited. It is noted that steps S13 and S14 correspond to an opposite-directional-vehicle-movement detecting means according to the present invention, and step S16 corresponds to a creeping-cut prohibiting means according to the present invention.

If it is determined that the vehicle speed VSP is out of the creeping-cut-prohibiting speed region (defined by VSP<−V1) at step S13, the program proceeds to step S17. At step S17, the creeping-cut-prohibiting timer NTM is reset at "0".

If it is determined that the creeping-cut-prohibition flag NFLAG indicates "1" (i.e., already prohibited state of creeping-cut) at step S12, the program proceeds to step S23 in order to judge whether or not the prohibition of creeping-cut should be released, i.e., whether or not the creeping-cut-prohibition flag NFLAG should be set at "0", as follows. At first, at step S23, it is judged whether or not the vehicle speed VSP is within the creeping-cut-prohibition releasing speed-region which is higher than or equal to the creeping-cut-prohibition releasing speed +V2 for the forward range as shown in FIGS. 4 and 5.

While it is determined that the vehicle speed VSP is within the creeping-cut-prohibition releasing speed-region (defined by VSP≧+V2) at step S23, it is judged whether or not a creeping-cut-prohibition releasing timer YTM has already indicated (has reached) a creeping-cut-prohibition-release determining value YTM1 at step S24. This creeping-cut-prohibition releasing timer YTM functions to measure an elapsed time from a timing when the vehicle speed VSP entered the creeping-cut-prohibition releasing speed-region. Until the indication of the creeping-cut-prohibition releasing timer YTM reaches the creeping-cut-prohibition-release determining value YTM1, the program proceeds to step S25. At step S25, the creeping-cut-prohibition releasing timer YTM is incremented, and thereby a time length elapsed from the timing when the vehicle speed VSP entered the creeping-cut-prohibition releasing speed-region (defined by VSP≧+V2) is measured.

When the creeping-cut-prohibition releasing timer YTM becomes larger than or equal to the creeping-cut-prohibition-release determining value YTM1 by the increment of the creeping-cut-prohibition releasing timer YTM at step S25, namely, when the set time corresponding to the creeping-cut-prohibition-release determining value YTM1 has elapsed from the timing when the vehicle speed VSP entered the creeping-cut-prohibition releasing speed-region (defined by VSP≧+V2); the program proceeds from step S24 to step S26. At step S26, the creeping-cut-prohibition flag NFLAG is reset at "0", so that the creeping-cut prohibition is released. It is noted that steps S23 and S24 correspond to a normal-directional-vehicle-movement detecting means according to the present invention, and step S26 corresponds to a creeping-cut-prohibition releasing means according to the present invention.

If it is determined that the vehicle speed VSP is out of the creeping-cut-prohibition releasing speed-region (given by VSP≧+V2) at step S23, the program proceeds to step S27. At step S27, the creeping-cut-prohibition releasing timer YTM is reset at "0".

If it is determined that the reverse range such as R-range is active (i.e., has been selected) at step S11, the program proceeds to step S32 in order to conduct the permission/prohibition of the creeping-cut as follows. At step S32, it is judged whether the creeping-cut-prohibition flag NFLAG (which is set as mentioned below) indicates "0" or "1". Thereby, it is judged whether the creeping-cut has not yet been prohibited or has already been prohibited.

If it is determined that the creeping-cut-prohibition flag NFLAG indicates "0" (NFLAG=0) at step S32, the program proceeds to step S33 in order to judge whether or not the creeping-cut should be prohibited, i.e., whether or not the creeping-cut-prohibition flag NFLAG should be set at "1" as follows. At first, at step S33, it is judged whether or not the vehicle speed VSP is within the creeping-cut-prohibiting speed region which is larger than or equal to the set value (+V2). As mentioned above, the value +V2 denotes the creeping-cut-prohibiting speed value in the case of reverse range, although the value +V2 denotes the creeping-cut-prohibition releasing speed value in the case of forward range shown in the time charts of FIGS. 4 and 5.

While it is determined that the vehicle speed VSP is within the creeping-cut-prohibiting speed region (defined by VSP≦+V2) at step S33, it is judged whether or not the creeping-cut-prohibiting timer NTM has already indicated (has reached) the creeping-cut-prohibition determining value NTM1 at step S34. This creeping-cut-prohibiting timer NTM functions to measure an elapsed time from a timing when the vehicle speed VSP entered the creeping-cut-prohibiting speed region (given by VSP≧+V2). Until the indication of the creeping-cut-prohibiting timer NTM reaches the creeping-cut-prohibition determining value NTM1, the program proceeds to step S35. At step S35, the creeping-cut-prohibiting timer NTM is incremented, and thereby a time length elapsed from the timing when the vehicle speed VSP entered the creeping-cut-prohibiting speed region (given by VSP≧+V2) is measured.

When the creeping-cut-prohibiting timer NTM becomes larger than or equal to the creeping-cut-prohibition determining value NTM1 by the increment of the creeping-cut-prohibiting timer NTM at step S35, namely, when the set time corresponding to the creeping-cut-prohibition determining value NTM1 has elapsed from the timing when the vehicle speed VSP entered the creeping-cut-prohibiting speed region (given by VSP≧+V2); the program proceeds from step S34 to step S36. At step S36, the creeping-cut-prohibition flag NFLAG is set at "1", so that the creeping-cut is prohibited. It is noted that steps S33 and S34 correspond to the opposite-directional-vehicle-movement detecting means according to the present invention, and step S36 corresponds to the creeping-cut prohibiting means according to the present invention.

If it is determined that the vehicle speed VSP is not within the creeping-cut-prohibiting speed region (given by VSP≧+V2) at step S33, the program proceeds to step S37. At step S37, the creeping-cut-prohibiting timer NTM is reset at "0".

If it is determined that the creeping-cut-prohibition flag NFLAG indicates "1" (i.e., already prohibited state of creeping-cut) at step S32, the program proceeds to step S43 in order to judge whether or not the prohibition of creeping-cut should be released, i.e., whether or not the creeping-cut-prohibition flag NFLAG should be set at "0", as follows. At first, at step S43, it is judged whether or not the vehicle speed VSP is within the creeping-cut-prohibition releasing speed-region which is lower than the set value (−V1). As mentioned above, the value (−V1) denotes the creeping-cut-prohibition releasing speed value in the case of reverse range, although the value (−V1) denotes the creeping-cut-prohibiting speed value in the case of forward range shown in the time charts of FIGS. 4 and 5.

While it is determined that the vehicle speed VSP is within the creeping-cut-prohibition releasing speed-region (define by VSP<−V1) at step S43, it is judged whether or not the creeping-cut-prohibition releasing timer YTM has already indicated (has reached) the creeping-cut-prohibition-release determining value YTM1 at step S44. This creeping-cut-prohibition releasing timer YTM functions to measure an elapsed time from a timing when the vehicle speed VSP entered the creeping-cut-prohibition releasing speed-region (given by VSP<−V1). Until the indication of the creeping-cut-prohibition releasing timer YTM reaches the creeping-cut-prohibition-release determining value YTM1, the program proceeds to step S45. At step S45, the creeping-cut-prohibition releasing timer YTM is incremented, and thereby a time length elapsed from the timing when the vehicle speed VSP entered the creeping-cut-prohibition releasing speed-region (defined by VSP<−V1) is measured.

When the creeping-cut-prohibition releasing timer YTM becomes larger than or equal to the creeping-cut-prohibition-release determining value YTM1 by the increment of the creeping-cut-prohibition releasing timer YTM at step S45, namely, when the set time corresponding to the creeping-cut-prohibition-release determining value YTM1 has elapsed from the timing when the vehicle speed VSP entered the creeping-cut-prohibition releasing speed-region (defined by VSP<−V1); the program proceeds from step S44 to step S46. At step S46, the creeping-cut-prohibition flag NFLAG is reset at "0", so that the creeping-cut prohibition is released. It is noted that steps S43 and S44 correspond to the normal-directional-vehicle-movement detecting means according to the present invention, and step S46 corresponds to the creeping-cut-prohibition releasing means according to the present invention.

If it is determined that the vehicle speed VSP is out of the creeping-cut-prohibition releasing speed-region (given by VSP<−V1) at step S43, the program proceeds to step S47. At step S47, the creeping-cut-prohibition releasing timer YTM is reset at "0".

After the prohibition/permission (status of the creeping-cut-prohibition flag NFLAG) of the creeping-cut was determined individually about the forward range or the reverse range as mentioned above referring to FIG. 2, an actual execution/release (status of a creeping-cut executing flag YFLAG) of the creeping-cut is determined by a processing of FIG. 3 based on the creeping-cut-prohibition flag NFLAG and a conventionally-general permission/release (status of a conventional creeping-cut permitting flag FLAG) of the creeping-cut.

At step S51 of FIG. 3, it is judged whether or not the creeping-cut executing flag YFLAG set as mentioned below indicates "1", so that it is judged whether the creeping-cut is being actually executed or is not being actually executed (i.e., during execution or not). If the status of the creeping-cut executing flag YFLAG is "1" (i.e., during execution of creeping-cut) at step S51, the program proceeds to step S52. At step S52, it is judged whether or not the conventional creeping-cut permitting flag FLAG indicates "0". Thereby, it is checked whether or not a conventionally-general releasing condition for the creeping-cut has been satisfied (i.e., whether or not the creep torque should be outputted by cancelling the creeping-cut).

The conventionally-general releasing and permitting conditions for the creeping-cut will now be explained. The latter permitting condition for the creeping-cut means a vehicle-stopped state including no intention to start moving the vehicle. For example, it is determined that the creeping-cut permitting condition is satisfied if the brake switch 12 of FIG. 1 is turned on in response to a stroke level of brake pedal or a fluid-pressure level of master cylinder which causes braking force to become greater than or equal to the set braking-force value and also if a state where the vehicle speed VSP is within a creeping-cut speed region near 0 has continued for a predetermined time duration. Moreover, the former releasing condition for the creeping-cut means a timing when a preparatory operation to start moving the vehicle is carried out under the vehicle-stopped state. For example, it is determined that the creeping-cut releasing condition is satisfied if the brake switch 12 of FIG. 1 is turned off in response to a stroke level of brake pedal or a fluid-pressure level of master cylinder which causes braking force to become smaller than the set braking-force value.

If it is determined that the conventionally-general creeping-cut releasing condition has been satisfied at step S52, namely if it is determined that the creep torque should be outputted by releasing the creeping-cut; the program proceeds to step S53. At step S53, the creeping-cut executing flag YFLAG is set at "0". Thereby, the creep torque is outputted without executing the creeping-cut.

However, if it is determined that the conventionally-general creeping-cut releasing condition is not satisfied at step S52, the program proceeds to step S54. At step S54, the creeping-cut executing flag YFLAG is maintained as it is. Thereby, current (present) execution/non-execution of the creeping-cut is continued.

If it is determined that the status of the creeping-cut executing flag YFLAG is "0" (YFLAG=0) at step S51, namely if it is determined that the creeping-cut is not during execution; the program proceeds to step S55. At step S55, it is judged whether the status of the creeping-cut-prohibition flag NFLAG is "0" or "1", so that it is judged whether the creeping-cut has not yet been prohibited or has already been prohibited. If the creeping-cut has not yet been prohibited (NFLAG=0), the program proceeds to step S56. At step S56, it is judged whether or not the conventionally-general creeping-cut permitting condition is satisfied by judging whether or not the status of the conventional creeping-cut permitting flag FLAG is "1". That is, at step S56, it is judged whether or not the creep torque should be made equal to 0 by the creeping-cut.

If it is determined that the conventionally-general creeping-cut permitting condition is satisfied at step S56, namely, it is determined that the creep torque should be made equal to 0; the program proceeds to step S57. At step S57, the creeping-cut is executed not to output the creep torque, by setting the creeping-cut executing flag YFLAG at "1".

On the other hand, if it is determined that the conventionally-general creeping-cut permitting condition is not satisfied at step S56, the program proceeds to step S58. At step S58, the creeping-cut executing flag YFLAG is maintained as it is. Thereby, current execution/non-execution of the creeping-cut is continued.

If it is determined that the status of the creeping-cut-prohibition flag NFLAG is "1" (prohibited state of creeping-cut) at step S55, the program proceeds to step S59. At step S59, the creeping-cut executing flag YFLAG is set at "0", regardless of the conventionally-general creeping-cut releasing or permitting condition as determined at steps S52 and S56. Thereby, the creep torque is outputted without executing the creeping-cut.

After the status of the creeping-cut executing flag YFLAG (execution or release of the creeping-cut) is given at steps S53, S54 and S57-S59 as mentioned above, the program proceeds to step S61. At step S61, it is judged whether or not the status of the creeping-cut executing flag YFLAG is "1". If the status of the creeping-cut executing flag YFLAG is "1" (YFLAG=1) at step S61, the program proceeds to step S62. At step 62, the creeping-cut is carried out. If the status of the creeping-cut executing flag YFLAG is not "1", the creeping-cut is released (cancelled) by not executing the process of step S62

<Operations and Effects>

Representative operations and effects obtainable according to the creeping-cut control of this embodiment as shown in FIGS. 2 and 3 will now be explained in a case shown in FIGS. 4 and 5. That is, as shown by a time chart of FIG. 4, the unintentionally-downward movement in the reverse direction (crawl down) is stopped by a braking. Afterward, as shown by a time chart of FIG. 5, a forward creep running is performed.

FIG. 4 is an operational time chart in the case that the electrically-driven vehicle moves downwardly in the reverse-running direction because of an upward slope or the like as shown by a time variation of the detection value of vehicle speed VSP although the creep torque is being outputted from the electric motor 2 with the forward range selected as shown in FIG. 4, and then the driver conducts the braking by a brake manipulation at time point t3 in order to prevent the downward movement in the reverse-running direction, so that the electrically-driven vehicle is stopped.

The detection value of vehicle speed VSP enters the creeping-cut-prohibiting speed region which is lower than the creeping-cut prohibiting speed (−V1), by the downward movement in the reverse-running direction at time point t1. At this time, the control program of FIG. 2 selects a loop including step S11, step S12, step S13, step S14 and step S15. By the process of step S15, the creeping-cut-prohibiting timer NTM is incremented. Thereby, elapsed time is measured from the time point t1 at which the detection value of vehicle speed VSP entered the creeping-cut-prohibiting speed region (defined by VSP<−V1).

At time point t2, the indication of the creeping-cut-prohibiting timer NTM reaches the creeping-cut-prohibition determining value NTM1. At this time, it is determined that the electrically-driven vehicle is doing the unintentionally downward movement (crawl down) in the reverse-running direction, at step S14. Thereby, the program proceeds from step S14 to step S16. As a result, at the time point t2, the creeping-cut-prohibition flag NFLAG is set at "1", so that a prohibiting command of the creeping-cut is issued.

At time point t3, the driver generates the braking by a brake manipulation in order to prevent the unintentionally downward movement of the vehicle in the reverse direction. In response thereto, the detection value of vehicle speed VSP varies toward 0 as shown in FIG. 4. When the detection value of vehicle speed VSP becomes equal to the value (−V1) at time point t4, the program comes to proceed from step S13 to step S17. Thereby, the creeping-cut-prohibiting timer NTM is reset at "0" as shown in FIG. 4.

At time point t5, a predetermined time period has just elapsed from a timing at which the vehicle speed VSP became near 0. At this time, as shown in FIG. 4, the conventional creeping-cut permitting flag FLAG is set at "1" because both of the creeping-cut permitting condition based on ON-state of the brake switch 12 (i.e., condition related to braking force) and the creeping-cut permitting condition related to vehicle speed VSP have been satisfied.

However, because the status of the creeping-cut-prohibition flag NFLAG is "1" since the time point t2, the control program of FIG. 3 selects a loop including step S51, step S55 and step S59. By the process of step S59, the creeping-cut executing flag YFLAG is set at "0". Thus, although the conventional creeping-cut permitting flag FLAG is set at "1" at the time point t5 as mentioned above, the creeping-cut is prohibited so that the creep torque continues to be outputted also after time point t5 as shown in FIG. 4

That is, according to this embodiment, it is detected that the electrically-driven vehicle is moving in the reverse-running direction opposite to the running direction of the forward range with creep torque being outputted by sensing the relation of VSP<−V1 (time point t1), and then this state has continued for the time duration set corresponding to the creeping-cut-prohibition determining value NTM1 for the timer (time point t2). At this time, the creeping-cut is prohibited by setting the creeping-cut-prohibition flag NFLAG at "1" at step S16. Then, at time point t3, the driver starts to apply the braking to the vehicle in order to prevent the reverse-directional movement of the vehicle. Thereby, the conventional creeping-cut permitting flag FLAG is set at "1" at the time point t5 after the vehicle speed VSP increased up to a level larger than or equal to the creeping-cut prohibiting speed −V1 at the time point t4. However, the creeping-cut is not performed so that the creep torque continues to be outputted also after time point t5 as shown in FIG. 4.

Supposing that the creeping-cut is realized in response to FLAG=1 of the time point t5, the driver has a feeling of strangeness because a torque reduction caused due to this creeping-cut is unrelated to the driving manipulations of the driver, i.e., is not intended by the driver. However, according to this embodiment, the torque reduction accompanied with the strangeness feeling can be prevented from occurring because the creep torque continues to be outputted by prohibiting the creeping-cut also after the time point t5 as shown in FIG. 4.

Moreover, in this embodiment, it is determined that the electrically-driven vehicle is moving in the reverse direction which is opposite to the running direction of the forward range, in the case that the detection value of vehicle speed VSP becomes lower than the creeping-cut prohibiting speed −V1 whose absolute value is slightly greater than a value obtained by adding the detection error of the vehicle speed sensor 7 to 0, but not in the case that the detection value of vehicle speed VSP becomes 0. Accordingly, the reverse-directional movement of the electrically-driven vehicle can be accurately detected because the detection error of the vehicle speed sensor 7 is removed. Therefore, the above-mentioned advantageous effects can be more enhanced.

Moreover, in this embodiment, it is determined that the electrically-driven vehicle has moved in the reverse direction when the time duration set corresponding to the creeping-cut-prohibition determining value NTM1 has just elapsed (at the time point t2) under the state where the detection value of vehicle speed VSP is lower than the creeping-cut prohibiting speed −V1. That is, it is not determined that the electrically-driven vehicle has moved in the reverse direction, immediately when the detection value of vehicle speed VSP becomes lower than the creeping-cut prohibiting speed −V1 (at the time point t1). Also from this viewpoint, the reverse-directional movement of the electrically-driven vehicle can be accurately detected so that the above-mentioned advantageous effects can be enhanced.

In a case that the vehicle speed VSP varies with time after the time point t5 as shown in FIG. 4; the creeping-cut-prohibiting timer NTM measures elapsed time again at time point t6 at which the vehicle speed VSP becomes equal to −V1, and then, the conventional creeping-cut permitting flag FLAG is reset at "0" at time point t7 at which the braking is finished. Since the creeping-cut-prohibition flag NFLAG is not set at "0" unless the vehicle speed VSP becomes higher than or equal to the creeping-cut-prohibition releasing speed +V2 as explained by the steps S23, S24 and S26 of FIG. 2, the creeping-cut-prohibition flag NFLAG is maintained at "1". Thereby, the prohibition of the creep cutting continues to be performed.

FIG. 5 is an operational time chart in a case that the creep running is realized to cause the detection value of vehicle speed VSP to vary with time as shown in FIG. 5 from the state where the creeping-cut is prohibited under the forward range as mentioned about FIG. 4, and then, the driver applies braking for a time length between time points t3 and t6 so that the vehicle speed VSP is reduced to finish the creep running and thereby to stop the vehicle as shown in FIG. 5.

At time point t1, the detection value of vehicle speed VSP enters the creeping-cut-prohibition releasing speed-region which is higher than or equal to the creeping-cut-prohibition releasing speed +V2, by the creep running. Thereby, the control program of FIG. 2 selects a loop including steps S11, S12, S23, S24 and S25. By executing the process of step S25, the creeping-cut-prohibition releasing timer YTM is incremented, and thereby, elapsed time from the time point t1 at which the vehicle speed VSP entered the creeping-cut-prohibition releasing speed-region (defined by VSP≧+V2) is measured.

At time point t2 at which the indication of the creeping-cut-prohibition releasing timer YTM reaches the creeping-cut-prohibition-release determining value YTM1, the process of step S24 determines that the electrically-driven vehicle is running by creeping in the normal direction identical with the running direction of the forward range which is being selected, so that the program proceeds from step S24 to S26. Hence, the creeping-cut-prohibition flag NFLAG is reset at "0" at the time point t2 as shown in FIG. 5, so that a prohibition-releasing command of the creeping-cut is issued.

As shown in FIG. 5, the conventional creeping-cut permitting flag FLAG is set at "1" when both of the creeping-cut permitting condition related to the vehicle speed VSP and the creeping-cut permitting condition of ON-state (braking) of the brake switch 12 have been satisfied. More specifically, the conventional creeping-cut permitting flag FLAG is not set at "1" until time point t5 at which a predetermined time period has just elapsed from a timing when the detection value of vehicle speed VSP became near 0. Then, the conventional creeping-cut permitting flag FLAG is reset at "0" at time point t6 at which the braking is finished. Hence, the status of the conventional creeping-cut permitting flag FLAG is still "0" at the time point t2 at which the prohibition-releasing command of the creeping-cut is issued.

Therefore, until time point t2 of FIG. 5, the control program of FIG. 3 selects a loop including steps S51, S55 and S59. From the time point t2 to the time point t5 of FIG. 5, the control program of FIG. 3 selects a loop including steps S51, S55, S56 and S58. That is, until time point t5 of FIG. 5, the creeping-cut executing flag YFLAG is maintained at "0" so that the creeping-cut is not conducted. Thus, the creep running can be realized by continuously outputting the creep torque as shown in FIG. 5.

At the time point t4 at which the vehicle speed VSP becomes lower than the creeping-cut-prohibition releasing speed (+V2), the program proceeds from step S23 to step S27 of FIG. 2. Hence, the creeping-cut-prohibition releasing timer YTM is reset at "0" as shown in FIG. 5.

From the time point t5 to the time point t6 of FIG. 5, the status of the creeping-cut-prohibition flag NFLAG is "0", and the status of the conventional creeping-cut permitting flag FLAG is "1" as mentioned above. Hence, during the time period between t5 and t6; at first, the control program of FIG. 3 selects a loop including steps S51, S55, S56 and S57 so that the creeping-cut executing flag YFLAG is set at "1", and then, the control program of FIG. 3 selects a loop including steps S51, S52 and S54 so that the creeping-cut executing flag YFLAG is maintained at "1". Accordingly, from the time point t5 to the time point t6 of FIG. 5, the creep torque is made to be equal to 0 by executing the creeping-cut in response to the status "1" of the creeping-cut executing flag YFLAG.

After the time point t6 of FIG. 5, the program proceeds from step S52 to step S53 of FIG. 3 in response to the status "0" of the conventional creeping-cut permitting flag FLAG. Thereby, the creeping-cut executing flag YFLAG is set at "0", so that the creep torque is outputted without executing the creeping-cut as shown in FIG. 5.

According to this embodiment, it is detected that the electrically-driven vehicle is moving in the forward direction same as the running direction of the forward range with creep torque being outputted, by sensing the relation of VSP≧+V2 (time point t1). Then, when this state (state where the detection value of vehicle speed VSP is higher than or equal to the creeping-cut-prohibition releasing speed +V2) has just continued for the predetermined time period corresponding to the creeping-cut-prohibition-release determining value YTM1 (time point t2), the prohibition of the creeping-cut is released (cancelled) by setting the creeping-cut-prohibition flag NFLAG at "0" at step S26. Afterwards, a normal creeping-cut control according to the conventional creeping-cut permitting flag FLAG can be performed without the strangeness feeling, as shown by the period t5 to t6 of FIG. 5.

Moreover, according to this embodiment, it is determined that the electrically-driven vehicle is moving in the forward direction identical with the (normal) running direction of the forward range in the case that the detection value of vehicle speed VSP has become higher than or equal to the creeping-cut-prohibition releasing speed value +V2 which is slightly larger than a value obtained by adding the detection error of the vehicle speed sensor 7 to 0, but not in the case that the detection value of vehicle speed VSP has become equal to 0. Accordingly, the forward movement of the electrically-driven vehicle can be accurately detected because the detection error of the vehicle speed sensor 7 is eliminated. Therefore, the above-mentioned advantageous effects can be more enhanced.

Moreover, according to this embodiment, it is determined that the electrically-driven vehicle has moved in the forward direction, when the time duration set corresponding to the creeping-cut-prohibition-release determining value YTM1 has just elapsed under the state where the detection value of vehicle speed VSP is higher than or equal to the creeping-cut-prohibition releasing speed value +V2 (at the time point t2). That is, it is not determined that the electrically-driven vehicle has moved in the forward direction, immediately when the detection value of vehicle speed VSP becomes higher than or equal to the creeping-cut-prohibition releasing speed value +V2 (at the time point t1). Also from this viewpoint, the vehicle movement in the forward direction can be accurately detected so that the above-mentioned advantageous effects can be more enhanced.

In the above embodiment, operations and effects have been explained only in the case where the forward range is being selected as a representative example, referring to FIGS. 4 and 5. However, even in the case where the reverse range is being selected, the control program of FIG. 2 proceeds from the step S11 to step S32 and selects a loop including steps S33 to S47. Then, the control of FIG. 3 is performed. Therefore, operations and effects similar to those in the case of forward range can be attained.

Moreover, the "creeping-cut" according to the embodiment of the present invention is not limited to bringing the creep torque to 0. The "creeping-cut" according to the embodiment may be a structure in which the creep torque is brought down to a level further smaller than a normal small value for the creep running.

What is claimed is:

1. A creeping-cut control apparatus for an electrically-driven vehicle,
    wherein the electrically-driven vehicle is configured to run by transmitting power from an electric motor to a road wheel in accordance with a shift range selected by a shift manipulation which is done by a driver to produce a running mode of the vehicle,
    wherein the electrically-driven vehicle is configured to creep at a very low speed by a creep torque derived from the electric motor,
    wherein the electrically-driven vehicle is configured to execute a creeping-cut such that the creep torque of the electric motor is reduced when a predetermined creeping-cut permitting condition is satisfied,
    the creeping-cut control apparatus comprising:
        an opposite-directional-vehicle-movement detecting section configured to detect that the electrically-driven vehicle is moving in a direction opposite to a running direction of the selected shift range under a state where the creep torque is being outputted without executing the creeping-cut; and a creeping-cut prohibiting section configured to prohibit the creeping-cut even if a speed of the vehicle becomes near 0 to satisfy the creeping-cut permitting condition after the opposite-directional-vehicle-movement detecting section detects that the vehicle has moved in the opposite direction.

2. The creeping-cut control apparatus according to claim 1, wherein the opposite-directional-vehicle-movement detecting section includes a creeping-cut prohibiting timer configured to measure elapsed time for which the vehicle is moving in the opposite direction, and the opposite-directional-vehicle-movement detecting section is configured to determine that the vehicle has moved in the opposite direction, when the creeping-cut prohibiting timer indicates a set time value.

3. The creeping-cut control apparatus according to claim 1, wherein the opposite-directional-vehicle-movement detecting section is configured to detect that the vehicle has moved in the opposite direction on the basis of a vehicle-speed detection value derived from a vehicle-speed sensor, and the opposite-directional-vehicle-movement detecting section is configured to detect that the vehicle is moving in the opposite direction, when the vehicle-speed detection value becomes slightly larger in the opposite direction than a value obtained by adding a detection error of the vehicle speed sensor to 0.

4. The creeping-cut control apparatus according to claim 1, wherein the creeping-cut control apparatus further comprises:

a normal-directional-vehicle-movement detecting section configured to detect that the electrically-driven vehicle is moving in a normal direction same as the running direction of the selected shift range under a state where the creep torque is being outputted without executing the creeping-cut; and a creeping-cut-prohibition releasing section configured to allow the creeping-cut to be performed at the time of satisfaction of the creeping-cut permitting condition by releasing the prohibition of the creeping-cut of the creeping-cut prohibiting section, when the normal-directional-vehicle-movement detecting section detects that the vehicle has moved in the normal direction.

5. The creeping-cut control apparatus according to claim 4, wherein the normal-directional-vehicle-movement detecting section includes a creeping-cut-prohibition releasing timer configured to measure elapsed time for which the vehicle is moving in the normal direction, and the normal-directional-vehicle-movement detecting section is configured to determine that the vehicle has moved in the normal direction, when the creeping-cut-prohibition releasing timer indicates a set time value.

6. The creeping-cut control apparatus according to claim 4, wherein the normal-directional-vehicle-movement detecting section is configured to detect that the vehicle has moved in the normal direction on the basis of a vehicle-speed detection value derived from a vehicle-speed sensor, and the normal-directional-vehicle-movement detecting section is configured to detect that the vehicle is moving in the normal direction, when the vehicle-speed detection value becomes slightly larger in the normal direction than a value obtained by adding a detection error of the vehicle speed sensor to 0.

* * * * *